(12) United States Patent
Rivera et al.

(10) Patent No.: US 6,891,148 B1
(45) Date of Patent: May 10, 2005

(54) SCALING DEVICE FOR PHOTOGRAPHIC IMAGES

(75) Inventors: Jorge E. Rivera, Titusville, FL (US); Robert C. Youngquist, Cocoa, FL (US); Robert B. Cox, New Smyrna Beach, FL (US); William D. Haskell, Mims, FL (US); Charles G. Stevenson, Mims, FL (US)

(73) Assignee: The United States of America as represented by the Administrator of the National Aeronatics and Space Administration, Washington, DC (US)

( * ) Notice: Subject to any disclaimer, the term of this patent is extended or adjusted under 35 U.S.C. 154(b) by 282 days.

(21) Appl. No.: 10/082,413

(22) Filed: Feb. 25, 2002

(51) Int. Cl.[7] .......................... G06M 7/00; G01C 3/00; G03B 17/18
(52) U.S. Cl. .................. 250/221; 250/216; 250/222.1; 33/276; 396/290
(58) Field of Search .............................. 250/201.5, 216, 250/221, 222.1, 223 R, 223 B; 396/290, 317, 315, 155; 33/266, 276, 286; 353/28, 30

(56) References Cited

U.S. PATENT DOCUMENTS

| | | | |
|---|---|---|---|
| 4,063,820 A | | 12/1977 | Borgese |
| 4,786,925 A | * | 11/1988 | Landwehr .................... 396/14 |
| 4,845,518 A | | 7/1989 | Landwehr |
| 4,894,551 A | * | 1/1990 | Kishimoto et al. ..... 250/559.23 |
| 5,189,463 A | * | 2/1993 | Capper et al. ............... 396/155 |
| 5,627,647 A | | 5/1997 | Baan et al. |
| 5,866,916 A | | 2/1999 | Pryor et al. |
| 5,912,727 A | | 6/1999 | Kawai |
| 5,985,495 A | | 11/1999 | Okumura et al. |
| 5,999,266 A | | 12/1999 | Takahashi et al. |
| 6,094,269 A | | 7/2000 | Ben-Dove et al. |
| 2003/0210406 A1 | * | 11/2003 | Hardy ........................ 356/603 |

* cited by examiner

Primary Examiner—Stephone B. Allen
(74) Attorney, Agent, or Firm—Randall M. Heald; Gary G. Borda; Guy Miller

(57) ABSTRACT

A scaling device projects a known optical pattern into the field of view of a camera, which can be employed as a reference scale in a resulting photograph of a remote object, for example. The device comprises an optical beam projector that projects two or more spaced, parallel optical beams onto a surface of a remotely located object to be photographed. The resulting beam spots or lines on the object are spaced from one another by a known, predetermined distance. As a result, the size of other objects or features in the photograph can be determined through comparison of their size to the known distance between the beam spots. Preferably, the device is a small, battery-powered device that can be attached to a camera and employs one or more laser light sources and associated optics to generate the parallel light beams. In a first embodiment of the invention, a single laser light source is employed, but multiple parallel beams are generated thereby through use of beam splitting optics. In another embodiment, multiple individual laser light sources are employed that are mounted in the device parallel to one another to generate the multiple parallel beams.

22 Claims, 5 Drawing Sheets

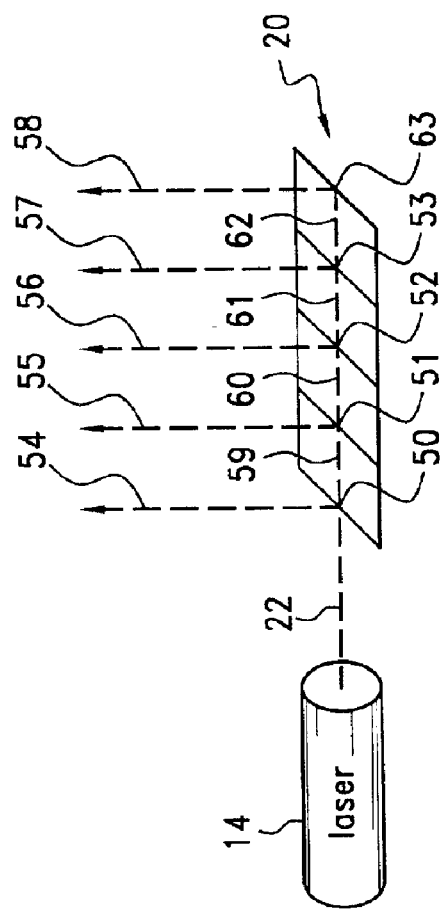
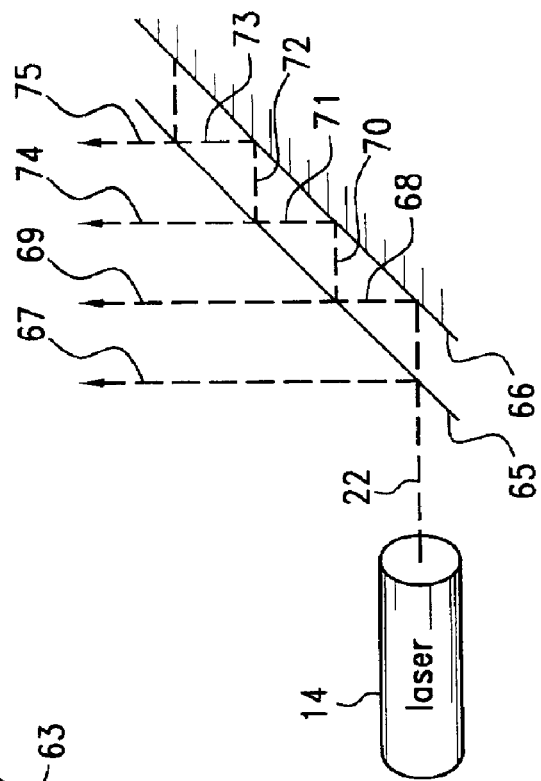
FIG.3
FIG.4

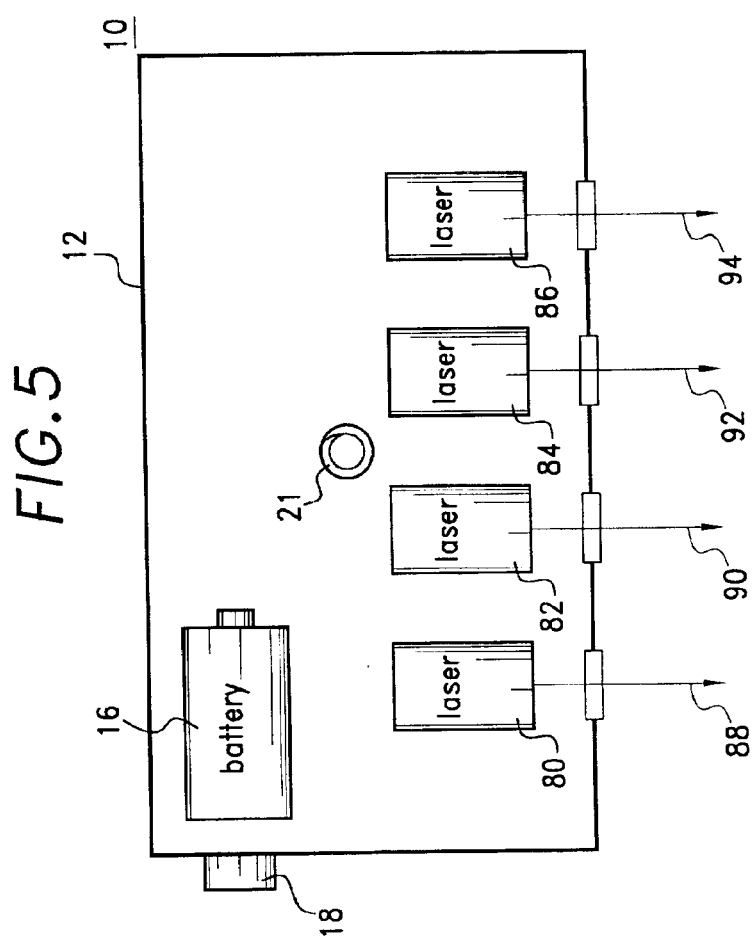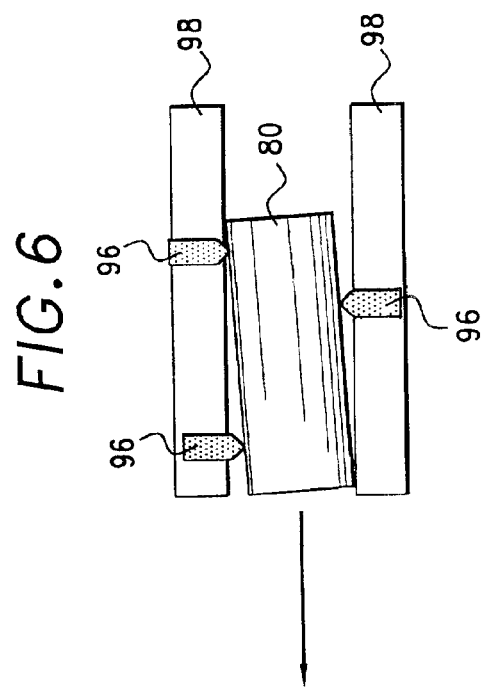

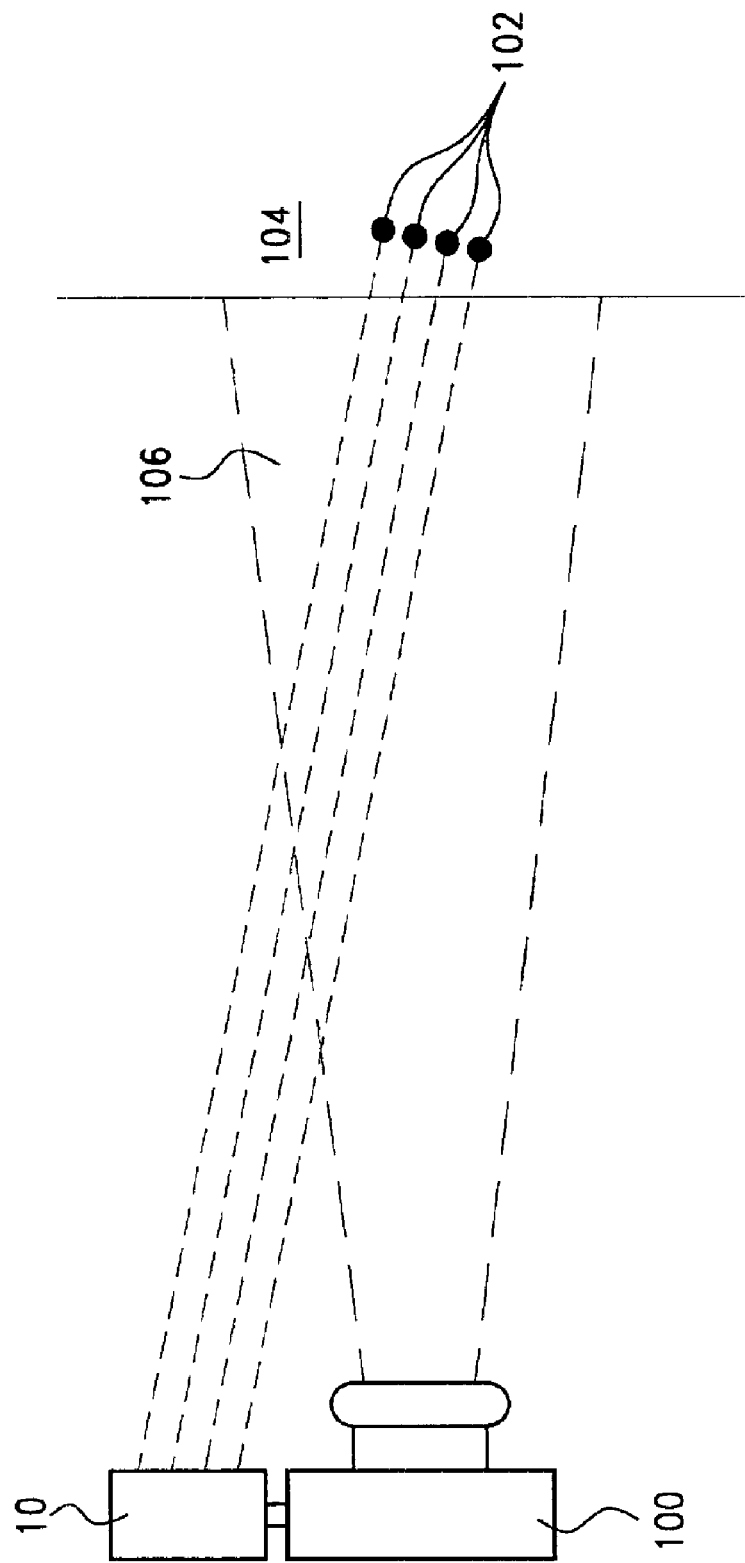

SCALING DEVICE FOR PHOTOGRAPHIC IMAGES

The invention described herein was made in the performance of work under a NASA contract and by an employee of the United States Government and is subject to the provisions of Public Law 96-517 (35 U.S.C. § 202), and may be manufactured and used by or for the Government for governmental purposes without the payment of any royalties thereon of therefore. In accordance with 35 U.S.C. § 202, the contractor elected not to retain title.

BACKGROUND OF THE INVENTION

1. Field of the Invention

The present invention relates in general to a device for providing a reference scale in photographic images that can be remotely projected into the field of view of a camera to facilitate size measurements of objects or features that are in the photograph

2. Description of the Background Art

Scaling devices, such as rulers, have long been used in photographs to provide a visual indication of the scale of other objects in the photograph. However, there are many situations where providing a scale reference in the photograph is overly difficult, if not impossible. As an example, NASA's Space Shuttle is often exposed to severe weather while on the launch pad at Kennedy Space Center during the many days leading up to a launch On at least one occasion, the Space Shuttle's External Tank (ET) suffered damage during a hailstorm that had to be examined to determine whether repairs were necessary. In this regard, it was necessary to determine the size of the hail damage sites on the ET's external foam because if the sites exceeded a certain size, they would have to be repaired. Actual examination of the ET's external foam would be difficult, time consuming, costly and dangerous given the inaccessibility resulting from the height, size and position of the ET while the Space Shuttle is on the launch pad. While the NASA operations personnel were able to measure the size of the hail damage sites in locations where access was possible, they had no way to do this along the large open expanse of the tank. Telephoto lenses might be used to zoom in and see the damage clearly, however, a viewer could not determine the scale of the damage because there would be no reference object in the image. This situation has therefore created a need for a technique that enables a scaling reference to be incorporated in a photograph of an object that is not readily accessible, thus precluding the actual physical placement of a scaling reference on or near the object.

SUMMARY OF THE INVENTION

The present invention fulfills the foregoing need through provision of a device for projecting a known optical pattern into the field of view of a camera so that the pattern can be employed as a reference scale in a resulting photograph. More particularly, an optical beam projector is provided that projects two or more spaced, parallel optical beams onto a surface of a remotely located object to be photographed. The resulting beam spots or lines on the object are spaced from one another by a known, predetermined distance. As a result, the size of other objects or features in the photograph can be determined through comparison of their size to the known distance between the parallel beam spots.

Preferably, the device is a small battery-powered device that can be attached to a camera and employs one or more laser light sources to generate the parallel light beams. In a first embodiment of the invention, a single laser light source is employed, but multiple parallel beams are generated thereby through use of beam splitting and reflecting optics. In a second embodiment, multiple individual laser light sources are employed that are mounted in the device parallel to one another to generate the multiple parallel beams. In this embodiment, fine adjustment means are provided to insure that the lasers beams remain parallel to one another. In both embodiments, the spacing between the beams is pre-selected to be some known value, such as an inch, for example.

In operation, the device is mounted on a camera in such a position that the parallel laser beams will form a sequence of spots or lines, depending on the type of laser employed, on the surface of the object to be photographed. A picture is then taken with the spots or lines in the field of view. The sizes of objects and features in the resulting photograph can then be determined through comparison to the known distance between the laser beam spots.

BRIEF DESCRIPTION OF THE DRAWINGS

The features and advantages of the present invention will become apparent from the following detailed description of a number of preferred embodiments thereof, taken in try conjunction with the accompanying drawings, in which:

FIG. 3 is schematic illustration showing a second alternative arrangement of optical elements for use in forming five equally spaced, parallel laser beams in the embodiment of FIG. 1;

FIG. 4 is schematic illustration showing a third alternative arrangement of optical elements for use in forming four or more equally spaced, parallel laser beams in the embodiment of FIG. 1;

FIG. 5 is a block diagram of a second preferred embodiment of the invention which employs a plurality of parallel laser light sources to form four equally spaced, parallel laser beams;

FIG. 6 is a schematic illustration showing a set screw arrangement that is employed with the embodiment of FIG. 5 to align the laser light sources relative to one another; and FIG. 7 is a schematic illustration showing use of the embodiments of the invention to form equally spaced light spots on an object to be photographed.

DETAILED DESCRIPTION OF THE PREFERRED EMBODIMENTS

Figure 1:
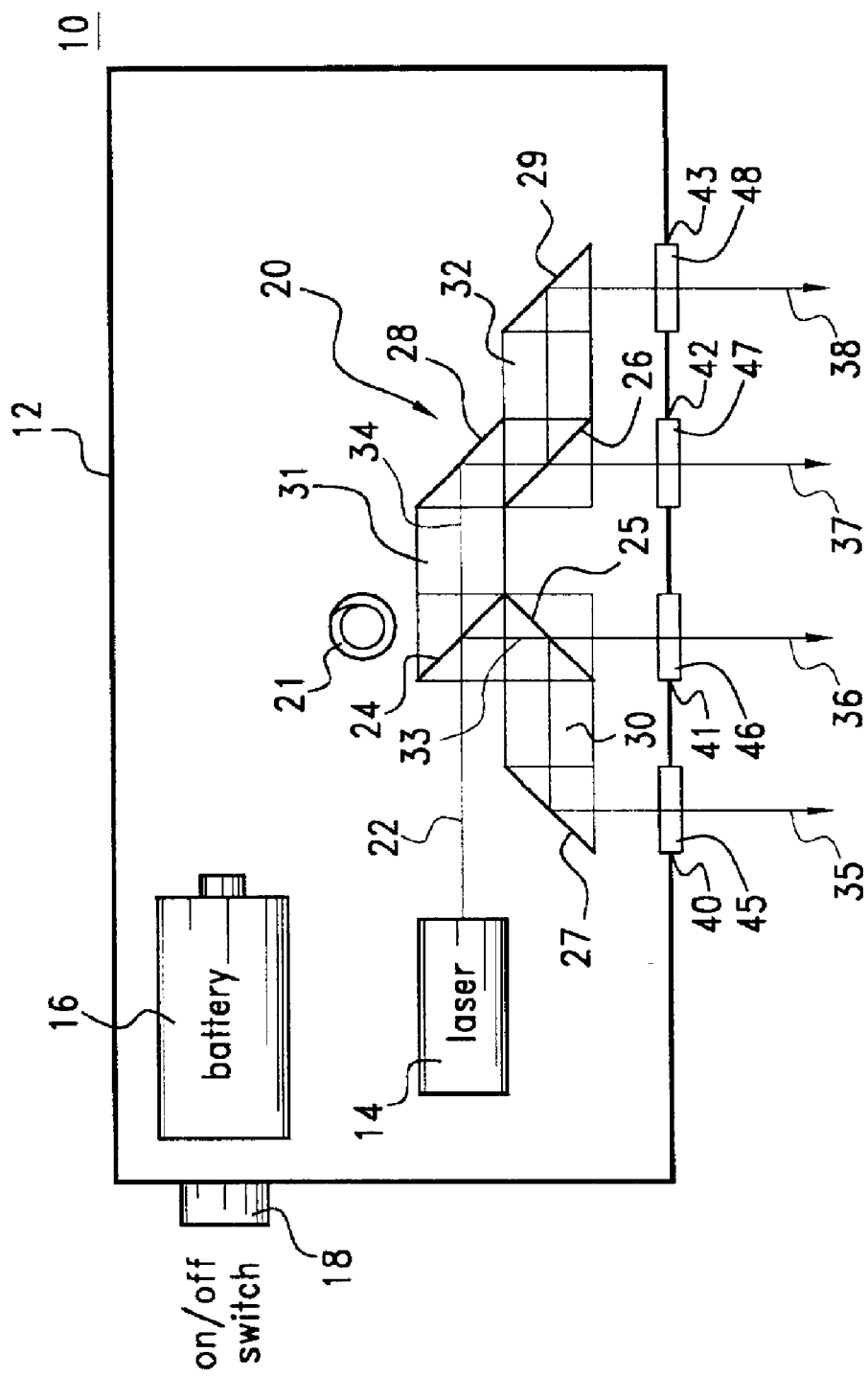
FIG. 1 is a block diagram of a first preferred embodiment of the invention that employs a single laser light source and beam splitting optics to form four equally spaced, parallel laser beams.

With reference to FIG. 1, an optical scaling device 10 is illustrated that is constructed in accordance with a first preferred embodiment of the present invention and is employed to project light spots or lines as a scale reference on an object to be photographed. The scaling device 10 includes a housing 12, which is preferably made of aluminum, delrin or any other suitable material. Disposed inside the housing 12 are a laser diode 14, a battery or other portable power supply 16, an on-off switch 18 and a collection of optical elements 20. A threaded shaft 21 extends from one side of the housing 12 that facilitates mounting of the device 10 to a suitable location, such as a tripod mounting nut of a camera, for example.

The on-off switch 18 is preferably located on the side of the housing 12 for controlling the application of voltage from the battery 16 to the laser diode 14. The battery 16 can, for example, be either a single lithium cell operating at three volts or two alkaline cells in series adding up to three volts. Three volts is sufficient to power not only one of the laser diodes 14, but also 4 or more of the laser diodes as employed in the second preferred embodiment illustrated in FIG. 5 and discussed later. A lithium battery is preferred because one cell is all that is required to power one or several of the laser diodes 14 and has sufficient capacity and drain current (approx. 200 mAmp) to drive four lasers for over an hour continuously. The laser diode 14 is preferably a coherent VIM laser diode that produces a 4.2 mW collimated laser beam 22 at 670 nm. Even though they are Class 3A lasers and are subject to some safety concerns, they are identical in performance to most auditorium pointers. Hence, eye safety should not be a concern with proper handling. If the use of the system were restricted to situations out of the direct sun then 1 mW, Class 2, lasers could be used with essentially no safety issues.

It should be noted that if cost were not a concern, a 635 nm laser would produce a brighter appearing beam spot because the human eye is more sensitive to the 635 nm wavelength. However, the cost of a 635 mm laser is higher than that of a 670 nm laser, which is why the 670 nm laser is preferred at the present time. Taking it one step further, a green laser would be better still than either 635 nm or 670 nm red lasers because the human eye is most sensitive to green wavelengths and the least power would be required to generate a clearly visible beam spot. Again, however, it would not be technically feasible at the present time to use a green laser in the subject invention because it is expensive and somewhat larger than desired for this application. It should also be noted that the laser diode 14 could alternatively be a laser line generator that is used to form equally spaced lines on an object, instead of spots.

The purpose of the optical elements 20 is to divide the laser beam 22 into 2 or more parallel equally spaced output beams that are used to form spots, or lines if the laser diode 14 is a laser line generator, on a remote object to be photographed. In the embodiment of FIG. 1, the optical elements 20 include a group of three beam splitters 24, 25 and 26, a group of three 45 degree angle mirrors 27, 28 and 29, and a group of three transparent, equal sized spacer blocks 30, 31 and 32. These elements are preferably aligned and glued together to form any desired configuration and number of output beams. In the embodiment of FIG. 1, the optical elements 20 are arranged to generate four output laser beams of equal intensity.

The first beam splitter 24 divides the input laser beam 22 into first and second internal beams 33 and 34, each of which has 50% of the intensity of the laser beam 22. The first internal beam 33 then passes through the second beam splitter 25, which splits the first internal beam 33 into first and second output beams 35 and 36, both of which have 25% of the intensity of the input laser beam 22. The first output beam 35 passes through the first of the spacer blocks 30 and is then reflected at a 90 degree angle by the first mirror 27. Similarly, the second internal beam 34, after passing through the second spacer block 31 and the second mirror 28, is incident on the third beam splitter 26, which divides the second internal beam 34 into third and fourth output beams 37 and 38, both of which also have 25% of the intensity of the input laser beam 22. The fourth output beam 38 passes through the third of the spacer blocks 32 and is then reflected at a 90 degree angle by the third mirror 29. The four output beams 35–38 exit the housing 12 through four apertures 40, 41, 42 and 43, respectively, in each of which is preferably disposed, a corresponding one of four transparent windows 45, 46, 47 and 48.

Figure 2:
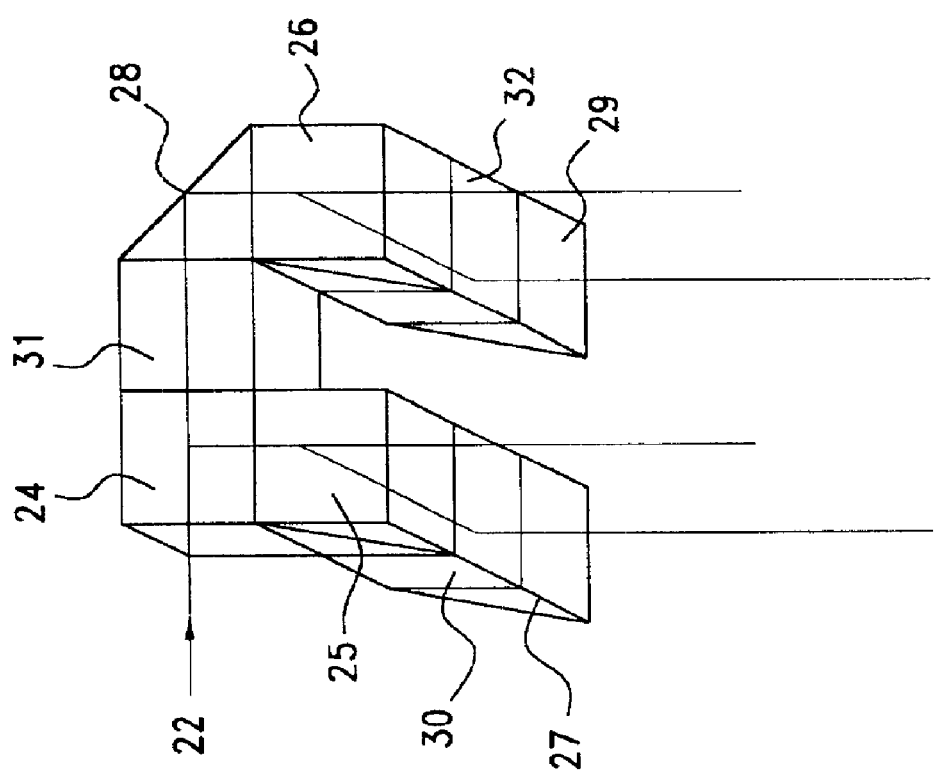
FIG. 2 is schematic illustration showing a first alternative arrangement of optical elements for use in forming four equally spaced, parallel laser beams in the embodiment of FIG. 1.

In this optimal configuration, all of the laser power ends up evenly distributed among the parallel evenly spaced output beams 35–38, which is a desirable, though not essential characteristic of the invention. The spacer blocks 30–32 insure the equal spacing, preferably an inch, between each adjacent pairs of the output beams 35–38. It should be noted that the various optical elements 20 could be rearranged in a number of ways to obtain the same basic result. For example, in the alternative arrangement of FIG. 2, the beam splitters 24–26, mirrors 27–29 and spacer blocks 30–32 are rearranged so that the four output beams 35–38 are in effect spaced at the corners of a square.

One side note should be made concerning the beam splitters 24–26. Polarization insensitive beam splitters should be used to insure that the resulting output beams are actually equal in intensity. If polarization dependent beam splitters are employed, then light passing through a first beam splitter would be somewhat polarized. As a result, when the light goes through the next beam splitter, the beam splitter will not split the light properly. Instead, it will transmit the same polarization as the first beam splitter, thereby resulting in a high intensity output beam and a low intensity output beam. Using polarization insensitive beam splitters eliminates this characteristic.

FIGS. 3 and 4 illustrate still further optical arrangements that can be employed to form multiple equally spaced output beams. In FIG. 3, the optical elements 20 include a group of four serially arranged beam splitters 50, 51, 52 and 53, each of which is selected to have a reflectivity which insures that each of a group of five output beams 54–58 has the same power or intensity. For example, if the input laser beam 22 has five milliwatts of power, the reflection in the first beam splitter 50 is selected to reflect one fifth of the laser power to yield a one milliwatt output beam 54 and a four milliwatt continuation beam 59. The second beam splitter would be selected to reflect one fourth of this power to yield a second one milliwatt output beam 55 and a three milliwatt continuation beam 60. This would be followed by a one third reflection for the third beam splitter 51 to yield the third one milliwatt output beam 56 and a two milliwatt continuation beam 61, one half reflection for the fourth beam splitter 52 to yield the fourth one milliwatt output beam 57 and a one milliwatt continuation beam 62, which is completely reflected off of a mirror 63 to become the fifth one milliwatt output beam 58. It should be noted that the top side of the optical element 20 would be antireflection coated.

FIG. 4 shows a less expensive optical arrangement for the scaling device 10 to operate from one laser, but results in a non-uniform set of laser spots. In this case two reflecting surfaces are used to generate the multiple beams. One surface is a partial reflector or beam splitter 65 and the other surface is a fully reflecting mirror 66. The input laser beam 22 reflects off of the partial reflector 65 to generate a first output beam 67 and the remainder of the beam 22 travels onward to the mirror 66 where it reflects completely as a first reflected beam 68. The first reflected beam 68 then hits the partial reflector 65 where part of the beam is transmitted, to become a second output beam 69 and the rest reflects back to the mirror surface as a second reflected beam 70. This process continues with the formation of third, fourth and fifth reflected beams 71, 72 and 73, and third and fourth output beams 74 and 75, and so on. Doing this multiple times thus results in a set of output laser beams 67, 69, 74 and 75, which may be very parallel, but in most cases will have different intensities. For example, if the partial reflector 65 is a 50/50 splitter, then the first output beam 67 will contain half of all the laser power, the second output beam 69 will contain $\frac{1}{4}^{th}$ of the power, the third beam 74 will contain $\frac{1}{8}^{th}$ of the power and so on. Such a rapid reduction in the intensities of the beams is somewhat extreme. However, if only two beams are required, for example, then a 50/50 reflector followed by only the mirror 66 would achieve this and the beams would be of the same intensity, which is the same as using just the first element of the configuration shown in FIG. 3. Also, if only three beams are required, rough uniformity can be achieved (e.g. a 38% reflector will produce beams with 38%, 38%, and 24% percentage power levels). It should also be noted that most lasers emit polarized light and further adjustments of these values can be achieved by rotation of the laser polarization axis. So a relatively inexpensive and robust three beam system should result from this approach.

An alternative embodiment of the invention is illustrated in FIG. 5 in which the single laser diode 14 of the embodiment of FIG. 1 is replaced by four laser diodes 80, 82, 84 and 86 that are disposed in the housing 12 so that 4 parallel, equally spaced laser output beams 88, 90, 92 and 94 are generated. As illustrated, this embodiment eliminates the need for beam splitters and other optical elements but does have the disadvantage that the laser diodes 80–86 must be precisely mounted in the housing 12 to insure that their output beams 88–94 are parallel to one another. With expensive laser diodes (e.g., $500), the necessary precision is automatically obtained because the generated beam is parallel to the body of the laser diode to within a few arc seconds. With less expensive laser diodes (e.g., $100), however, the output beams are not usually parallel to the laser body, and are typically off by a fill degree. As a result, a fine adjustment mechanism must be provided to insure that the output beams 88–94 are parallel to one another.

FIG. 6 illustrates an example of an adjustment mechanism comprising six set screws 96 that are located to provide slight adjustment to the propagation angles of the output beams 88–94. More particularly, the set screws 96 preferably comprise six nylon tipped set screws with fine-pitched thread (2–56), three in each adjustment plane (i.e. three adjust azimuth and three adjust elevation) of each laser diode 80–86. FIG. 6 shows how the three set screws 96 are typically arranged in a holder 98 for the first laser diode 80. One acts as a fulcrum while the other two each act in a seesaw fashion to both tilt and rigidly hold the body of the laser diode 80. This technique is not perfect and actually relies on deforming the laser body, which is typically made of a thin sheet of brass. However, in most cases, due to this deformation of the laser body, a very tightly mounted laser is obtained that maintains alignment for long time periods.

As an alternative, one of the laser diodes 80–86, or an additional laser diode, could be disposed in the housing 12 so that its output beam is slightly tilted with respect to the other beams. In this case, the image would show the three (four) spots and a fourth (fifth) spot whose location in the photo would indicate distance. By choosing an angle of say one degree, the fourth or fifth spot would move one inch over for every five feet in distance to the image. If $\frac{1}{16}^{th}$ inch resolution can be measured this would correspond to a four-inch distance resolution that might be useful for some applications.

It should be noted that while the foregoing embodiments of the invention each employ four or more output beams, a workable device could be made using only two output beams of known spacing The use of four or more output beams is advantageous, however, because it enhances visibility of the resulting spots or lines on a photograph and makes the photograph easier to analyze. In addition, in the four laser embodiment, redundancy is provided so that the device would continue to function even if one or two of the lasers fails or gets knocked out of alignment.

In the operation of any of the embodiments of the invention, the scaling device 10 is attached to a tripod mounting nut or other suitable location on a camera 100 as illustrated in FIG. 7. The device 10 is switched on and adjusted until the multiple laser spots or lines 102 are visible on an object 104 in a field of view 106 of the camera 100. A photograph is then taken and later examined to identify objects, features or defects therein that need to be analyzed for size using the laser beam spots or lines 102 as scaling reference. The known pattern supplies a scale for the photo and allows the size of the objects, features or defects to be measured directly on the photograph. This provides a capability for the user whereby photos of even relatively remote objects (e.&, 60–80 feet away) can be taken with a built in scale allowing size determination.

To demonstrate the effectiveness of the invention, a system was assembled using the four laser embodiment of FIG. 5 and a target located 80 feet from the device. The laser beam directions were adjusted with the set screws until each spot hit the appropriate location on the target. The system was then allowed to sit under various loads to determine if the beams "wandered" in time due to temperature or strain induced drifts. No wander was observed with an aluminum housing, though an earlier version machined out of delrin (a black plastic) showed significant drift requiring the rejection of that design in the multiple laser embodiment. This issue would of course not apply to the single laser embodiments of the invention.

The two main embodiments of the invention, single laser and multiple laser, both have a number of advantages and disadvantages, though the single laser embodiments appear to be more desirable overall. There is one notable situation where multiple lasers might be preferable to a single laser and an optical element, namely, when fairly high optical powers are required from each beam. Standard visible diode lasers are available up to 10 mW of continuous power, but if more than 10 mW of total optical power is needed (e.g. in a full sunlight situation one might want six 3 mW beams in which case a single laser may not be available to generate the necessary 18 mW), then one might use three 9 mW lasers and appropriate optics.

Using the single laser embodiment provides several advantages over the multiple laser embodiment. Probably the most important advantage is the improved ruggedness of the beam alignment. When separate lasers are used to generate parallel beams, there is always a concern that one of the lasers may become misaligned, which is a serious concern as has already been discussed. Use of alignment adjustment set screws helps with this problem, however, they make the device sensitive to shock (e.g., such as may occur from being dropped from small distances) and can result in one laser being slightly shifted relative to another. Since the device is used to generate spots that are a known distance apart, small shifts in angle can ruin the device's performance (e.g. at a distance of 30 feet, one minute of arc corresponds to 0.1 inches, or a ten percent error in a one inch spacing). Using one or more optical elements effectively eliminates this source of error. Consider the variation of the optical element in FIG. 4 and assume that the optical element is a single piece of material (e.g. glass) coated on one side to be the partial reflector 65 and on the other side to be the mirror 66. Assuming that the two sides of this piece of glass are parallel (one arc minute of parallelism is easily obtained in modern element manufacture) then the only source of error will be due to tilt of the laser relative to the glass window, and this motion now primarily tilts all of the beams and causes only a small change in the beam spacing (e.g. a full degree tilt of the laser leads to less than a one part in 50 error).

Using one laser to generate all of the beams also results in a significant savings on battery life. It should be noted that the amount of optical power generated by a typical fully packaged laser diode is not a strong function of the electrical power, (e.g. Coherent VLM laser diodes draw 55 mAmp typical regardless of whether the laser produces 0.95 mW or 4.2 mW at 670 nm). Consequently, a four-fold increase of battery life would be gained by using a single 4.2 mW laser and an optical element to create four parallel laser beams in place of four individual 0.95 mW lasers. Finally, although the cost of lasers varies widely depending upon reliability, beam quality, etc., even if the laser is relatively inexpensive, being able to replace some number of lasers with a single optical element should prove cost effective.

The optical pattern chosen, be it spaced spots or lines, will not change its scale as the camera is tilted up and down. In other words, if a defect is seen above the user's head, then the camera can be simply tilted up, a photo taken, and the horizontal set of laser spots will still indicate one inch spacings. Note that that the vertical projection in the image will be scaled by this angle and that only the horizontal dimension can be quantified directly.

The preferred embodiments have a couple of minor negative features including the following. The 3 mW laser beams may be difficult to see in full direct sunlight. In this case the user may need to use a color filter to enhance contrast. Also, if the device is attached to a camera and the user looks directly at a surface which is perpendicular to the line of site, then the spots will be one inch apart and damage sites can be quantified in size. Also, as stated above, if the art user looks up or down, holding the camera horizontal, then the horizontal direction in the photo will be scaled correctly, but not the vertical. The vertical image though will be scaled by the cosine of the tilt angle and the user must include this additional scaling parameter in order to quantify the size of the image. However, it has been determined that the user will rarely be taking a picture at a tilt angle of more than 10 degrees. Simple trigonometry can then be used to show that this will introduce a measurement error of about $1/64^{th}$ of an inch for every inch measured. Since the unit is limited to about $1/16^{th}$ inch (maybe $1/32^{nd}$ inch if care is taken), then the tilt error is negligible in practice.

In conclusion, the scaling device of the present invention provides a pattern of known dimensions that appears in a photograph thus allowing objects and features therein to be scaled. This is important, for example, for documentation and decision making concerning defects on flight hardware located in areas where there is no immediate access, but where a line of site exists. The device can provide approximately $1/16^{th}$ of an inch resolution out to a distance of about 80 feet. Additionally, the device is small and easily used by being manually attached to most cameras, using a threaded tripod out located under the camera.

Although the invention has been disclosed in terms of a number of preferred embodiments and variations thereon, it will be understood that numerous additional variations and modifications could be made thereto without departing from the scope of the invention as defined in the following claims. For example, if the cameras used with the device are digital and allow the images to be transferred to a computer for processing, then software could be written to look for the laser spots and to automatically scale photos for use in damage size determination.

We claim:

1. A scaling device for projecting an optical scale reference pattern in a linear direction extending substantially parallel to an imaginary line extending between a camera's lens and an object of interest, for providing a scale reference pattern in a resulting photograph of said object of interest, comprising:

a) a housing; and
   b) means disposed in said housing for generating a plurality of equally spaced, parallel output light beams extending from said housing toward said object of interest;
   whereby, said device provides parallel output beams extending substantially parallel to the imaginary line extending between said camera's lens and said object of interest to form a pattern of equally spaced light spots thereon.

2. The scaling device of claim 1, further including a means on said housing for attaching said device to a camera.

3. The scaling device of claim 1, wherein said means disposed in said housing for generating a plurality of equally spaced, parallel output light beams comprises:

1) a light source disposed in said housing for generating a first light beam;
   2) a power source disposed in said housing for powering said light source; and
   3) a collection of optical elements disposed in said housing and positioned to receive said light beam and form said plurality of equally spaced, parallel output beams.

4. The scaling device of claim 3, wherein said light source comprises a laser diode.

5. The scaling device of claim 3, wherein said optical elements include a plurality of beam splitters and a plurality of mirrors that arranged to divide said light beam into said plurality of output beams.

6. The scaling device of claim 5, wherein said optical elements are arranged so that said output beams have equal intensities.

7. The scaling device of claim 5, wherein said collection of optical elements includes a plurality of equal size spacers that are assembled with said plurality of beam splitters and plurality of mirrors so that the spacing between each pair of adjacent beams in said plurality of output beams is equal.

8. The scaling device of claim 1, wherein said means disposed in said housing for generating said plurality of equally spaced, parallel output light beams comprises:

1) a plurality of light sources disposed parallel to one another, with each light source generating a corresponding one of said plurality of equally spaced, parallel output beams; and
   2) a power source disposed in said housing for powering said light sources.

9. The scaling device of claim 8, wherein each of said light sources comprises a laser diode.

10. The scaling device of claim 8, further including adjustment means for adjusting the position of each of said light sources to insure that said output beams are parallel to one another.

11. The scaling device of claim 8, wherein said power source comprises a battery power supply disposed in said housing for powering said light sources.

12. A method for providing a scale reference pattern on an object in a photographic image comprising the steps of
   a) providing a housing and means disposed in said housing for generating a plurality of equally spaced, parallel output light beams, each of said beams being spaced from one another by a predetermined distance;
   b) positioning said housing so that said parallel output beams extend in a direction substantially parallel to an imaginary line extending between a camera's lens and said object to form an optical pattern on said object;
   c) photographing said object with said camera to obtain an image having said optical pattern therein; and
   d) examining said image to determine scale attributes of said object from said optical pattern.

13. The method of claim 2, wherein said step of positioning said housing further comprises the step of mounting said housing on said camera.

14. The method of claim 12, wherein said step of providing means disposed in said housing for generating a plurality of equally spaced, parallel output light beams comprises providing: a light source disposed in said housing for generating a first light beam; a power source disposed in said housing for powering said light source; and a collection of optical elements disposed in said housing and positioned to receive said light beam and form said a plurality of equally spaced, parallel output beams.

15. The method of claim 14, wherein said light source is selected to a be a laser diode.

16. The method of claim 14, wherein said optical elements are selected to include a plurality of beam splitters and plurality of mirrors that are arranged to divide said light beam into said plurality of output beams.

17. The method of claim 16, wherein said optical elements are selected to be arranged so that said output beams have equal intensities.

18. The method of claim 12, wherein said step of providing means disposed in said housing for generating a plurality of equally spaced, parallel output light beams comprises providing: a plurality of light sources disposed parallel to one another in said housing, each for generating a corresponding one of said plurality of equally spaced, parallel output beams; and a power source disposed in said housing for powering said light sources.

19. The method of claim 18, wherein said step of providing a plurality of light sources disposed parallel to one another in said housing further comprises providing adjustment means for adjusting positioning of each of said light sources, and adjusting positioning of each of said light sources until said output beams are parallel to one another.

20. The method of claim 18, wherein said light source is selected to be a laser diode.

21. A scaling device adaptable for projecting a plurality of parallel light beams in a direction substantially parallel to an imaginary line extending between a camera's lens and an object of interest, for creating a scale reference pattern in a photographic image of said object of interest taken by said camera, comprising:
   a) a housing;
   b) at least one light source disposed in said housing;
   c) means for generating a plurality of spaced apart, parallel output beams extending between said housing and said object of interest in a direction substantially parallel to the imaginary line extending between the camera's lens and the object of interest;
   d) at least one power source disposed in said housing for powering said at least one light source; and
   e) adjustment means for assuring said equally spaced output beams extend substantially parallel to one another between said housing and said object of interest.

22. A method of utilizing at least one light source and at least one power source for creating a scale reference pattern in a photographic image of an object of interest, comprising the steps of:
   a) generating a plurality of spaced-apart, substantially parallel extending output beams spaced a predetermined distance apart from said at least one light source and said at least one power source;
   b) substantially aligning said beams with an imaginary line extending between a camera's lens and said object of interest;
   c) providing at least one adjustment assembly for adjusting said at least one light source to assure said beams extend substantially parallel to one another; and
   d) photographing said object of interest with said scale reference pattern projected thereon.

* * * * *